US010766168B2

(12) United States Patent
Nielsen et al.

(10) Patent No.: US 10,766,168 B2
(45) Date of Patent: Sep. 8, 2020

(54) DEVICE FOR MANUFACTURING A COMPOSITE PRODUCT

(71) Applicant: Siemens Gamesa Renewable Energy A/S, Brande (DK)

(72) Inventors: Per Nielsen, Vodskov (DK); Sigmund Wenningsted Torgard, Fredericia (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 163 days.

(21) Appl. No.: 15/949,562

(22) Filed: Apr. 10, 2018

(65) Prior Publication Data
US 2018/0281235 A1 Oct. 4, 2018

Related U.S. Application Data

(62) Division of application No. 14/708,193, filed on May 9, 2015, now Pat. No. 9,943,989.

(30) Foreign Application Priority Data

Jun. 2, 2014 (EP) .................................... 14170791

(51) Int. Cl.
*B29C 31/08* (2006.01)
*B29C 31/00* (2006.01)
(Continued)

(52) U.S. Cl.
CPC ............ *B29C 31/08* (2013.01); *B29C 31/008* (2013.01); *B29C 37/0075* (2013.01);
(Continued)

(58) Field of Classification Search
CPC ....... B29C 31/08; B29C 31/008; B29C 43/12; B29C 70/542; B29C 3/18; B29C 11/04;
(Continued)

(56) References Cited

U.S. PATENT DOCUMENTS 3,166,186 A * 1/1965 Karn ......................... G09F 3/10
428/42.3
3,915,776 A * 10/1975 Kaempen ................. B29C 70/00
156/161
(Continued)

FOREIGN PATENT DOCUMENTS

EP 0434258 A2 6/1991
EP 0661147 A2 * 7/1995 ............. B29C 53/44
(Continued)

OTHER PUBLICATIONS

EP Search Report dated Feb. 9, 2015, for EP patent application No. 14170791.9.

*Primary Examiner* — Hemant Desai
*Assistant Examiner* — Jacob A Smith
(74) *Attorney, Agent, or Firm* — Beusse Wolter Sanks & Maire

(57) ABSTRACT

A device for manufacturing a composite product has a first folded layer with a first and second superposed portion extending from a respective first and second free end to a first bend connecting the first and second superposed portions, and a second folded layer with a third and fourth superposed portion extending from a respective third and fourth free end to a second bend connecting the third and fourth superposed portions, wherein the first and second folded layers are laid adjacent to each other in order that the second portion of the first folded layer is in contact with the third portion of the second folded layer, the first and second folded layers being oriented with respect to each other in order to extend from a first side including the first, second, third and fourth free ends to a second side including the first and second bend.

9 Claims, 5 Drawing Sheets

(51) Int. Cl.
  *B29C 37/00* (2006.01)
  *B29C 70/54* (2006.01)
  *B29C 70/30* (2006.01)
  *B23P 15/04* (2006.01)
  *B29K 623/00* (2006.01)

(52) U.S. Cl.
  CPC .......... *B29C 70/542* (2013.01); *B23P 15/04* (2013.01); *B29C 31/085* (2013.01); *B29C 70/30* (2013.01); *B29K 2623/12* (2013.01); *Y10T 29/49337* (2015.01); *Y10T 29/49801* (2015.01)

(58) Field of Classification Search
  CPC ....... B29C 31/00; B29C 31/085; B29C 37/00; B29C 37/005; B29C 70/30; B29C 70/54; B29C 70/01; B29D 7/01; B29K 2105/06
  USPC .......................................................... 493/458
  See application file for complete search history.

(56) References Cited

U.S. PATENT DOCUMENTS

| | | | | |
|---|---|---|---|---|
| 4,777,005 A * | 10/1988 | Miller | B29C 53/043 | 264/285 |
| 4,777,201 A * | 10/1988 | Shigemoto | B29C 33/68 | 524/269 |
| 4,826,420 A * | 5/1989 | Frey | B29C 53/04 | 264/322 |
| 4,885,317 A * | 12/1989 | Thein | B29C 44/5636 | 521/149 |
| 4,954,306 A * | 9/1990 | Jamet | B29C 55/005 | 26/106 |
| 4,955,803 A * | 9/1990 | Miller | B29C 53/043 | 264/339 |
| 5,102,609 A * | 4/1992 | Miller | B29C 53/043 | 264/285 |
| 5,123,985 A * | 6/1992 | Evans | B29D 7/01 | 156/212 |
| 5,456,781 A * | 10/1995 | Tingley | B29C 70/525 | 156/154 |
| 5,585,062 A | 12/1996 | Muramatsu et al. | | |
| 5,660,901 A * | 8/1997 | Wong | B29B 15/122 | 156/199 |
| 5,736,209 A * | 4/1998 | Andersen | B05B 11/0037 | 428/36.4 |
| 5,810,961 A * | 9/1998 | Andersen | B27N 3/002 | 156/324 |
| 6,096,669 A * | 8/2000 | Colegrove | B29B 11/16 | 264/136 |
| 7,608,213 B2 * | 10/2009 | Bergsma | B29C 53/04 | 264/285 |
| 2001/0009312 A1 * | 7/2001 | Takeda | B29D 7/01 | 264/216 |
| 2002/0037393 A1 * | 3/2002 | Strobel | B29D 7/01 | 428/156 |
| 2003/0111764 A1 * | 6/2003 | Nagashima | B29D 7/01 | 264/212 |
| 2003/0193107 A1 * | 10/2003 | Byrne | B29C 43/104 | 264/148 |
| 2004/0000746 A1 * | 1/2004 | Montagna | B29C 51/02 | 264/544 |
| 2004/0089981 A1 * | 5/2004 | Byrne | A01K 15/026 | 264/326 |
| 2004/0212112 A1 * | 10/2004 | Tsujimoto | B29D 7/01 | 264/1.34 |
| 2005/0012239 A1 * | 1/2005 | Nakashima | B29C 41/28 | 264/216 |
| 2005/0212165 A1 * | 9/2005 | Yamazaki | B29C 39/14 | 264/146 |
| 2009/0216169 A1 * | 8/2009 | Hansen | A61F 15/001 | 602/48 |
| 2009/0315212 A1 * | 12/2009 | Minoura | B29C 31/08 | 264/284 |
| 2010/0298788 A1 | 11/2010 | Uematsu | | |
| 2011/0086237 A1 * | 4/2011 | Chambers | B29C 65/1432 | 428/516 |
| 2012/0015186 A1 * | 1/2012 | Honma | C08L 23/10 | 428/375 |
| 2012/0273989 A1 * | 11/2012 | Graf | B29C 31/066 | 264/148 |
| 2014/0037974 A1 * | 2/2014 | Kondo | B29C 48/08 | 428/500 |

FOREIGN PATENT DOCUMENTS

| | | | |
|---|---|---|---|
| EP | 0661147 A2 | 7/1995 | |
| EP | 1967171 A1 * | 9/2008 | ............ A61K 9/703 |
| EP | 1967171 A1 | 9/2008 | |

* cited by examiner

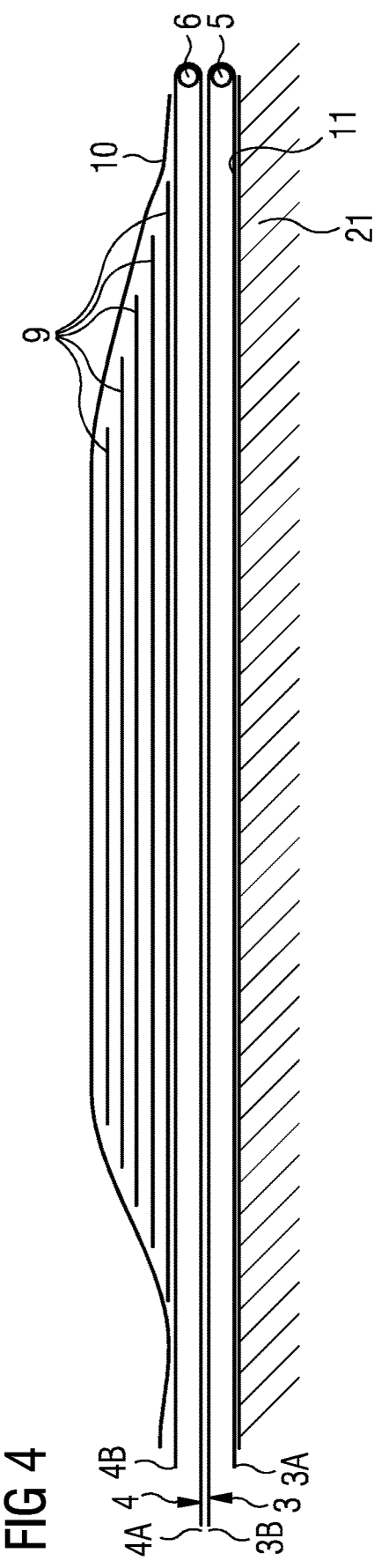

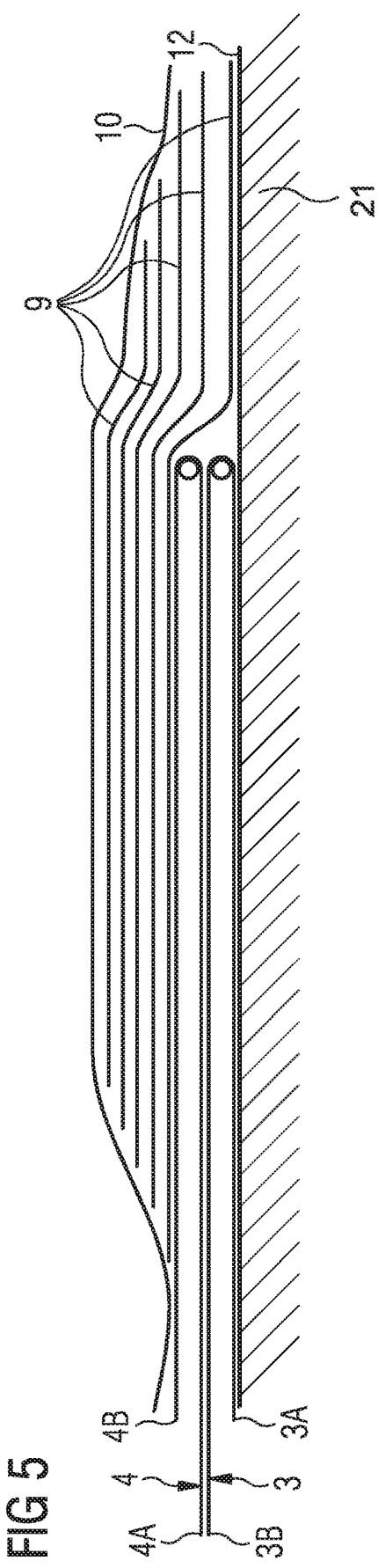

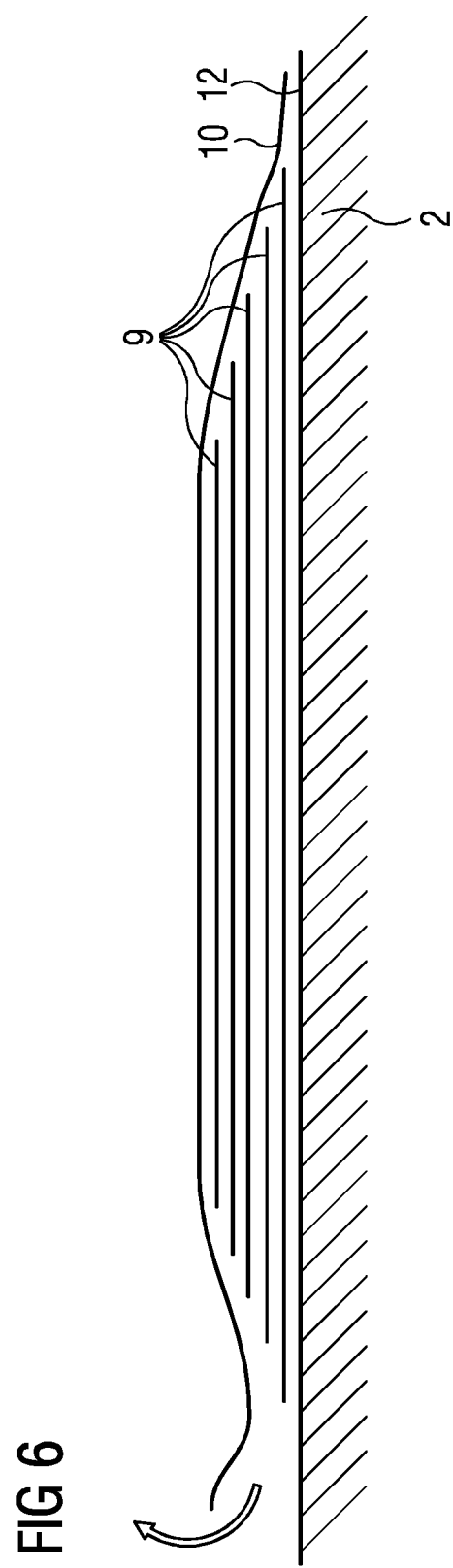

DEVICE FOR MANUFACTURING A COMPOSITE PRODUCT

CROSS REFERENCE TO RELATED APPLICATIONS

This application is a divisional of and claims priority to pending U.S. application Ser. No. 14/708,193, filed May 9, 2015, and claims the benefit of European Application No. EP14164954 filed Jun. 2, 2014. All of the applications are incorporated by reference herein in their entirety.

FIELD OF INVENTION

The present invention relates to a device tool to be used during the manufacturing of a composite product.

ART BACKGROUND

Composite materials that consist of a fibrous material and a matrix (often polymeric) material have found widespread use in wind turbine blades, naval structures and ship hulls, aircraft structure, sporting equipment and others.

The strength and quality of such structures and products depends strongly on the fibres and/or yarns to be straight.

Any disruption, wrinkling, bulges and waviness created when handling the fibres and/or yarns may thus be highly undesirable as they will weaken the finished structure. However, as these fibres and/or yarns in their virgin state are very flexible and difficult to handle, there is a considerable risk of creating said defects when placing and handling the fibres during manufacturing of previously mentioned components. The risk is especially high, when attempting to handle stacks of multiple fibres, yarns or fabrics.

One way of making the handling of fibres and yarns easier is by stitching them together, thus creating a fabric. The number of fibres that constitute a fabric can be varied to suit the requirements of the structure, e.g. a fabric with many fibres can be used in one place and a fabric with fewer fibres can be used in another place. This thus requires the manufacturing of at least two different fabrics. This can increase costs, as approximately 50% of cost of a fabric is the cost of arranging the fibres into a fabric.

An alternative way of achieving areas with varying amounts of fibres is to use a fabric with relatively few fibres, and then stack a number of fabrics on top of each other to achieve the desired number of fibres in that area and to make a gradual transition between areas with different requirements to the number of fibres. The main disadvantage of this solution is that any overlapping or stacked fabrics must be placed in sequence, which is a disadvantage for production time in an industrial application.

Another disadvantage with using fabrics is that a bulge or wrinkle may not be isolated to a single fibre, but rather affects the entire fabric thus increasing the extents of the defect

SUMMARY OF THE INVENTION

It may be an object of the present invention to provide a method for optimally handling stacks of fibres, yarns or fabrics layers and/or any combination thereof during the manufacturing of a composite material.

More in particular, it may be an object of an embodiment of the present invention to provide a method for manufacturing a composite material which allows correct placement of fibres, yarns or fabrics layers and/or any combination by minimizing the risk of disruption, wrinkles or bulges.

It may be a further object of the present invention, in an embodiment, to provide a method for manufacturing a composite material without having to preliminarily manufacture a fabric including a plurality of fibre layers.

In order to achieve the objects defined above, a method for manufacturing a composite material according to the independent claim is provided. The dependent claims describe advantageous developments and modifications of the invention.

According to a first aspect of the present invention, a method for manufacturing a composite product includes: —folding a first layer of thin material in order to create a first folded layer having a first and a second superposed thin portions extending from a respective first and second free end to a first bend, —folding a second layer of thin material in order to create a second folded layer having a third and a fourth superposed thin portions extending from a respective third and fourth free end to a second bend, —laying the first folded layer over a first element with the first portion in contact with the first element, —laying the second folded layer over the first folded layer with the third thin portion in contact with the second thin portion of the first folded layer, the first and second folded layers being oriented with respect to each other in order to extend from a first side including the first, second, third and fourth free ends to a second side including the first and second bend, —laying a second element over the second folded layer, —and pulling the second free end of the first folded layer and the third free end of the second folded layer in order to extract the first and second folded layers from between the first and second element in order to let the first and second element to contact with each other.

By "first element" and "second element" it is meant two elements, which may of the same material or of different material, which may be solid, rigid, flexible, soft or liquid. One or both of the first and second elements may be a portion of the composite product. One or the other of the first and second elements may be a support structure, for example a mould for the manufacturing of the composite product. The extraction of first and second folded layers allows the first and second element to go in contact with each other progressively during the extraction step, in order to avoid the wrinkles, bulges or waviness, which are likely to form in many known applications, when the second element is directly laid over the first element.

After the extraction of the first and second folded layers from between the first and second element, the manufacturing of the composite product continues with conventional steps of the moulding technology, which are therefore not described in detail, in order to produce the final composite product, which will include one or both of the first and second elements.

According to possible embodiments of the present invention, the method further includes laying the first folded layer over a first support surface of a third element with the first portion in contact with the first support surface, the second element comprising a plurality of fibre layers and a cover surface over the plurality of fibre layers, the method further including moving the assembly comprising the first and second folded layers, the plurality of fibre layers and the cover surface over a second support surface of the first element with the first portion in contact with the second support surface, before pulling the second free end of the first folded layer and the third free end of the second folded layer in order to extract the first and second folded layers from the assembly including the first and second folded layers and the plurality of fibre layers, in order to let the fibre layers to contact the second support surface.

By "first support surface" it is meant any surface on a temporary third element where the first and second folded layers, the plurality of fibre layers and the cover surface are stacked. The first support surface can be conveniently chosen in order to make the stacking process easy and practical, thus avoiding the formation of wrinkles, bulges or waviness that may result in defects in the final composite product which may weaken it.

By "second support surface" it is meant the final position over the second element where the stack previously created has to be placed in order that the composite product is finally produced. The second support surface may be, for example, the surface of a mould or the upper surface of another composite product.

Advantageously, the method of an embodiment of the present invention allows manufacturing of composite material components in a parallelized process, where the final arrangement of fibres, yarns and/or fabrics has been composed of a number of sub-arrangements that have been laid up at separate locations and then placed in the final arrangement. Moving the stacks from the first support surface to the second support surface without formation of wrinkles, bulges or waviness is assured by the first and second folded layers, providing a base for the stack of fibre layer. According to method embodiments of the present invention the first and second folded layers are then conveniently extracted from under the stack, leaving the fibre layers over their final desired position.

This gives a significant reduction in production time and costs for a composite product.

Advantageously, albeit not exclusively, this method is applicable to the production of large products and components, for example wind turbine blades, naval structures, ship hulls, aircraft structures and sporting equipment.

According to a further exemplary embodiment of the present invention, the steps of folding the first layer and second layer include inserting a first roller and a second roller respectively between the first and the second superposed thin portions and between the third and the fourth superposed thin portions, respectively at the first and second bend.

Advantageously, the use of rollers allow the first and second folded layer to roll around the rolls, in order not to have relative motions between the first folded layer and the second support surface and between the second folded layer and the stack According to possible embodiments of the present invention, folding the first layer and the second layer include inserting a first plurality of rollers and a second plurality of rollers respectively between the first and the second superposed thin portions and between the third and the fourth superposed thin portions, the first plurality of rollers and second plurality of rollers respectively having a first roller at the first bend and a second roller at the second bend.

Advantageously, the use of plurality of rollers instead of a single roll in the folded layers allows to manage efficiently embodiments where high transversal force acts on the first and second folded layers. This may occur, for example, when the stack of fibre layers is particularly thick and, therefore, heavy.

According to a further exemplary embodiment of the present invention, the rollers of the first plurality of rollers and of the second plurality of rollers are uniformly distribute along the first and second folded layers, respectively.

According other exemplary embodiments of the present invention, the method further includes applying vacuum in the volume between the cover surface and the second folded layer.

In this embodiment, the cover surface may be the surface of a gastight membrane.

Advantageously, in the embodiments comprising a plurality of fibre layers, applying vacuum allows to compress the fibres layers, in order to make it easier to move the entire stack of fibres from the first support surface to the second support surface.

According other exemplary embodiments of the present invention, in the assembly comprising the first folded layer and the second folded layer, the second free end and the third free end protrudes with respect to first free end (3A) and the fourth free end.

Advantageously, this makes it easier to apply the pulling force to the second free end and to the third free end in order to extract the first and second folded layers.

According further exemplary embodiments of the present invention, the method further includes fixing the first free end of the first folded layer and the fourth free end of the second folded layer, before pulling the second free end of the first folded layer and the third free end of the second folded layer.

According to other exemplary embodiments of the present invention, this makes more stable and controllable the step of pulling the second free end of the first folded layer and the third free end of the second folded layer in order to extract the first and second folded layer.

According to a second aspect of the present invention, a device for manufacturing a composite product includes: —a first folded layer having a first and a second superposed thin portions extending from a respective first and second free end to a first bend connecting the first and the second superposed thin portions, —a second folded layer having a third and a fourth superposed thin portions extending from a respective third and fourth free end to a second bend connecting the third and the fourth superposed thin portions, —first and second folded layer being laid adjacent to each other in order that the second thin portion of the first folded layer is in contact with the third thin portion of the second folded layer, the first and second folded layers being oriented with respect to each other in order to extend from a first side including the first, second, third and fourth free ends to a second side including the first and second bend.

The device comprising the first and second folded layers permits to reach the same effects and advantages explained with reference to the first aspect of the invention.

According to other exemplary embodiments of the present invention, the first and/or second layer of thin material are made of a thin film of polypropylene, or other similar material characterized by low friction properties and sufficient strength to avoid yielding or breakage. This contributes to avoid friction forces and relative motions between the first folded layer and the second support surface and between the second folded layer and the stack.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless otherwise notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

FIG. 6 shows a step of the method of the present invention to be executed after the step of FIG. 5.

DETAILED DESCRIPTION

Figure 1:
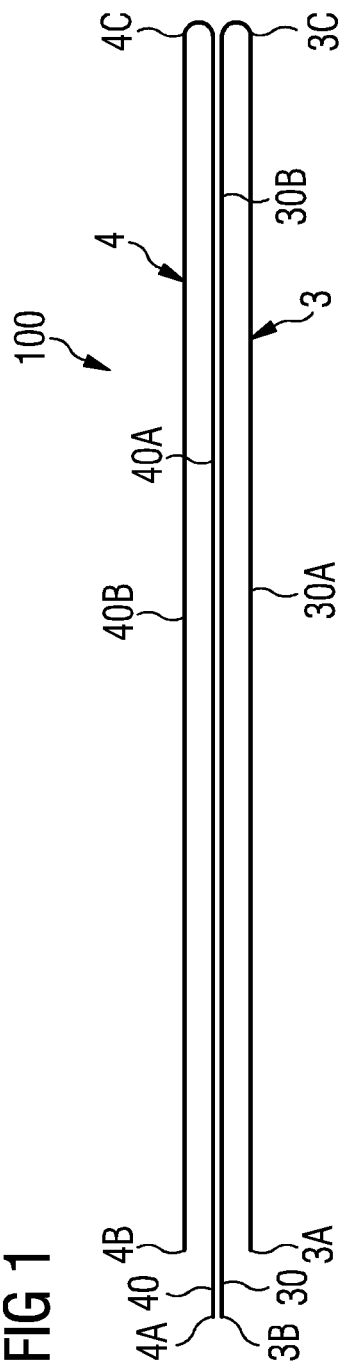
FIG. 1 shows a lateral view of an embodiment of a device to be used when manufacturing a composite material according to an aspect of the present invention.

FIG. 1 shows a device 100, according to an embodiment of the present invention, to be used as a tool during the manufacturing of a composite product.

The device 100 includes a first folded layer 3 having a first and a second superposed thin portion 30A, 30B. The first superposed thin portion 30A extends from a first free end 3A to a first 180° bend 3C. The second superposed thin portion 30B extends from a second free end 3B to the first 180° bend 3C, which consequently connects the first and the second superposed thin portions 30A, 30B. The first folded layer 3 is folded in order that the second free end 3B protrudes with respect to the first free end 3A, i.e. the second thin portion 30B, in the lateral views of FIGS. 1-6, are longer than the first thin portion 30A.

The device 100 further includes a second folded layer 4 having a third and a fourth superposed thin portions 40A, 40B. The third superposed thin portion 40A extends from a third free end 4A to a second 180° bend 4C. The fourth superposed thin portion 40B extends from a second free end 4B to the first 180° bend 4C, which consequently connects the first and the second superposed thin portions 40A, 40B. The first folded layer 4 is folded in order that the third free end 4A protrudes with respect to the fourth free end 4B, i.e. the third thin portion 40A, in the lateral views of FIGS. 1-6, are longer than the fourth thin portion 40B.

The first and the second folded layer 30, 40 of thin material are made of polypropylene.

According to other embodiments of the present invention, the first and the second folded layer 30, 40 are made of another thin material having low friction properties, and sufficient strength to avoid yielding or breakage.

According to different embodiments of the present invention, the first and second folded layer 3, 4 can be identical or different in dimensions and/or material.

In any case, in the device 100, the first and second folded layer 3, 4 are laid adjacent to each other in order that the second thin portion 30B of the first folded layer 3 is in contact with the third thin portion 40A of the second folded layer 4. The first and second folded layers 3, 4 are oriented with respect to each other in order to extend from a first side including the first, second, third and fourth free ends 3A, 3B, 4A, 4B to a second side including the first and second bend 3C, 4C.

According to possible alternative embodiments of the present invention (FIGS. 3A-3B), the first folded layer 3 and second folded layer 4 include a first roller 5 and a second roller 6 respectively between the first and the second superposed thin portions 30A, 30B and between the third and the fourth superposed thin portions 40A, 40B, respectively at the first and second bend 3C, 4C.

Figure 2:
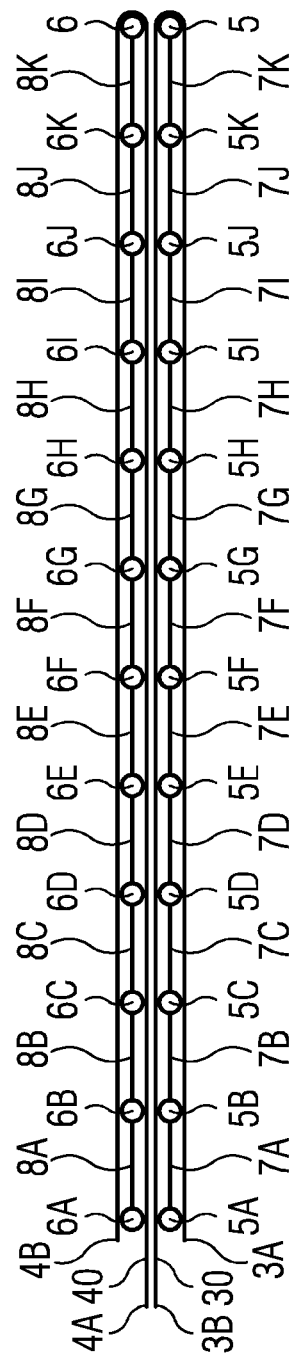
FIG. 2 shows an alternative embodiment of the device of FIG. 1.

FIG. 2 shows an alternative embodiment of the device 100, where the first folded layer 3 and second folded layer 4 include a first plurality of rollers 5, 5A-K (12 rollers) and a second plurality of rollers 6, 6A-Kb (12 rollers), respectively, between the first and the second superposed thin portions 30A, 30B and between the third and the fourth superposed thin portions 40A, 40B. The first plurality of rollers 5, 5A-K and second plurality of rollers 6, 6A-K respectively includes a first roller 5 at the first bend 3C and a second roller 6 at the second bend 4C, as in the embodiments in FIGS. 3A-3B. The rollers of the two plurality of rollers 5, 5A-K and 6, 6A-K are uniformly distributed along the first and second folded layers 3, 4, respectively, and the device 100 further includes a first plurality of links 7A-K and a second plurality of links 8A-K for respectively linking the rollers in each plurality 5, 5A-K and 6, 6A-K to each other. In each plurality of rollers 5, 5A-K and 6, 6A-K, linking the rollers by means of the links 7A-K and 8A-K keeps them from bundling up on top of each other. The links 7A-K and 8A-K may be rigid or flexible.

According to another possible embodiment (not shown) of the present invention, in each plurality of rollers 5, 5A-K and 6, 6A-K, rollers may be linked by a respective single link.

Embodiments with rollers (FIGS. 2 and 3A-3B) find particular use in applications with high transverse force on the folded layers 3, 4, in order to reduce friction between portions 30A, 30B and 40A, 40B, respectively, during the application of the method according to the present invention.

Figure 3A:
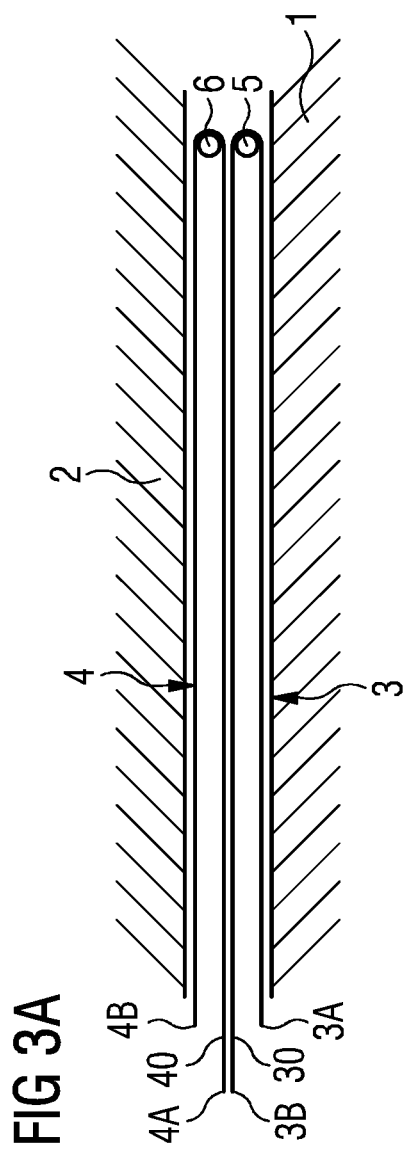
FIG. 3A shows a lateral view of a step of a method for manufacturing a composite material according to an embodiment of the present invention.
Figure 3B:
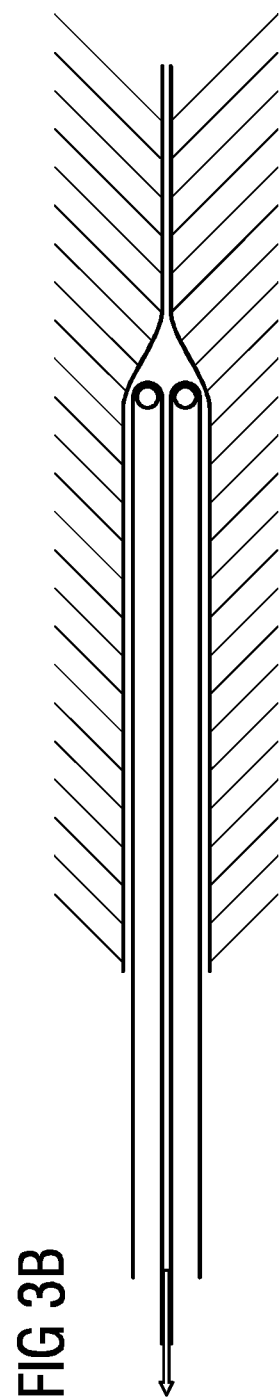
FIG. 3B shows a step of an embodiment of the method of the present invention to be executed after the step of FIG. 3A, FIGS. 4 and 5 show two steps, respectively corresponding to the steps shown in FIGS. 3A and 3B, of an alternative embodiment of the method of the present invention.

With reference to FIGS. 3A and 3B, a method for manufacturing a composite product according to an embodiment of the present invention includes: —folding a first layer 30 of thin material, for example polypropylene, in order to create the first folded layer 3, —folding a second layer 40 of thin material, for example polypropylene, in order to create a second folded layer 4, —laying the first folded layer 3 of the device 100 over a first element 1 with the first portion 30A in contact with the first element 1, —laying the second folded layer 4 of the device 100 over the first folded layer 3 with the third thin portion 40A in contact with the second thin portion 30B of the first folded layer 3, the first and second folded layers 3, 4 being oriented with respect to each other in order to extend from a first side including the first, second, third and fourth free ends 3A, 3B, 4A, 4B to a second side including the first and second bend 3C, 4C, —laying a second element 2 over the second folded layer 4, —pulling the second free end 3B of the first folded layer 3 and the third free end 4A of the second folded layer 4 in order to extract the first and second folded layers 3, 4 from between the first and second element 1, 2, in order to let them contact each other smoothly and secondly to go in contact with each other progressively during the extraction step, in order to avoid the wrinkles, bulges or waviness.

According to embodiments of the present invention, before the step of pulling, the method further includes the step of fixing the first free end 3A of the first folded layer 3 and the fourth free end 4B of the second folded layer 4, in order to make more stable and controllable the step of pulling.

In the method embodiment of FIGS. 3A and 3B, a single roller 5, 6 is used at each bend 3C, 4C, respectively.

According to other possible embodiments of the present invention, no rollers inside the folded layers 3, 4 are used (FIG. 1) or a plurality of rollers (FIG. 2) are used.

Rollers are advantageously used in application with high transverse forces acting on the folded layers 3, 4, in particular depending from a high weight of the second element 2.

The radius of rollers 5, 6 or of rollers 5, 5A-K and 6, 6A-K are dependent from the dimensions and mechanical characteristics of the folded layers 3, 4 and of the two elements 1, 2. The choice has to be made in order that the diameters or rollers are: —small enough to cause no or minimum disruption in the two elements 1, 2 during extraction, —large enough to not cause folds or wrinkles in the folded layers 3, 4.

In the embodiment of FIG. 2 links 7A-K and 8A-K keeps rollers 5, 5A-K and 6, 6A-K from bundling up on top of each other. If the rollers bundle up, then the friction and thus the required pulling force for extracting the folded layers 3, 4 increase, and the risk of disrupting the materials 1, 2 may also increase.

With reference to FIGS. 4 to 6, another embodiment of the method according to the present invention further includes the step of laying the first folded layer 3 over a first support surface 11 of a third element 21 with the first portion 30A in contact with the first support surface 11 (FIG. 4). The second element 2 includes a plurality of fibre layers 9 laid over the second folded layer 4 and a cover surface 10 laid over the plurality of fibre layers 9.

The third element 21 is any element which can provide a first support surface 11 for easily and conveniently performing the following steps of the method, in particular the step of laying the fibre layers 9 over the second folded layer 4. Normally, in known application, fibre layers 9 are laid directly over a mould or over other stacks of fibre layers which are not always easily reachable, thus increasing the risk of bulges or wrinkles formation.

Before pulling (FIG. 5) the second free end 3B of the first folded layer 3 and the third free end 4A of the second folded layer 4 in order to extract the first and second folded layers 3, 4, this embodiment of the method further includes moving the assembly including the first and second folded layers 3, 4, the plurality of fibre layers 9 and the cover surface 10 over a second support surface 12 of the first element 1 with the first portion 30A in contact with the second support surface 12.

The second support surface 12 may be the upper surface of a mould or of another stack of fibre layers.

After extracting the first and second folded layers 3, 4, the method further includes removing the cover surface 10 from over the fibre layers 9 (FIG. 6). After this, the manufacturing of the composite product continues with the repletion of the steps above described in order to place another stack of fibres on top of the stack of fibres 9. Alternatively the manufacturing of the composite product continues with conventional steps, known in the field of the moulding technology.

The cover surface 10 is any surface which makes easy and practical moving the stack of fibre layers 9 from the first support surface 11 to the second support surface 12.

In particular, according to another embodiment of the present invention the cover surface 10 is a gastight membrane and the method includes applying vacuum in the volume between the cover surface 10 and the second folded layer 4 in order to compress the fibres layers 9 and, therefore, make it easier to move the entire stack of fibres from the first support surface to the second support surface.

According to a further embodiment of the present invention (not shown) the cover surface 10 is the rigid surface of a structure or mould. In this case, instead of vacuum, a transverse force to compress the fibres layers 9 may be exerted by means of gravity or hydraulics devices.

The invention claimed is:

1. A device for manufacturing a composite product comprising:
    a first folded layer comprising a first and a second superposed portion extending from a respective first and second free end to a first bend connecting the first and the second superposed portions, and
    a second folded layer comprising a third and a fourth superposed portion extending from a respective third and fourth free end to a second bend connecting the third and the fourth superposed portions,
    wherein the first and second folded layers are laid adjacent to each other in order that the second portion of the first folded layer is in contact with the third portion of the second folded layer, the first and second folded layers being oriented with respect to each other in order to extend from a first side including the first, second, third and fourth free ends to a second side including the first and second bend, and
    wherein the first folded layer and second folded layer include a first roller and a second roller respectively between the first and the second superposed portions and between the third and the fourth superposed portions, respectively at the first and second bend.

2. The device according to claim 1,
    wherein the first folded layer and second folded layer include a first plurality of rollers comprising the first roller and a second plurality of rollers comprising the second roller respectively between the first and the second superposed portions and between the third and the fourth superposed portions.

3. The device according to claim 2,
    wherein rollers of the first plurality of rollers and of the second plurality of rollers are uniformly distributed along the first and second folded layers, respectively.

4. The device according to claim 1,
    wherein the first and/or second layer are made of polypropylene.

5. The device according to claim 2, further comprising a plurality of first roller links, where each link of the plurality of first roller links connects respective adjacent first rollers of the first plurality of rollers.

6. The device according to claim 5, wherein each link comprises a flexible material.

7. The device according to claim 5, wherein each link comprises a rigid material.

8. The device according to claim 2, further comprising a first roller link configured to connect plural rollers of the first plurality of rollers.

9. The device according to claim 2, further comprising a gastight membrane disposed over the second folded layer and forming a volume between the gastight membrane and the second folded layer.

* * * * *